Aug. 7, 1951      J. A. SCRUGGS      2,563,192
APPARATUS FOR CONTROLLING FLUID PRESSURES
Filed Aug. 26, 1946
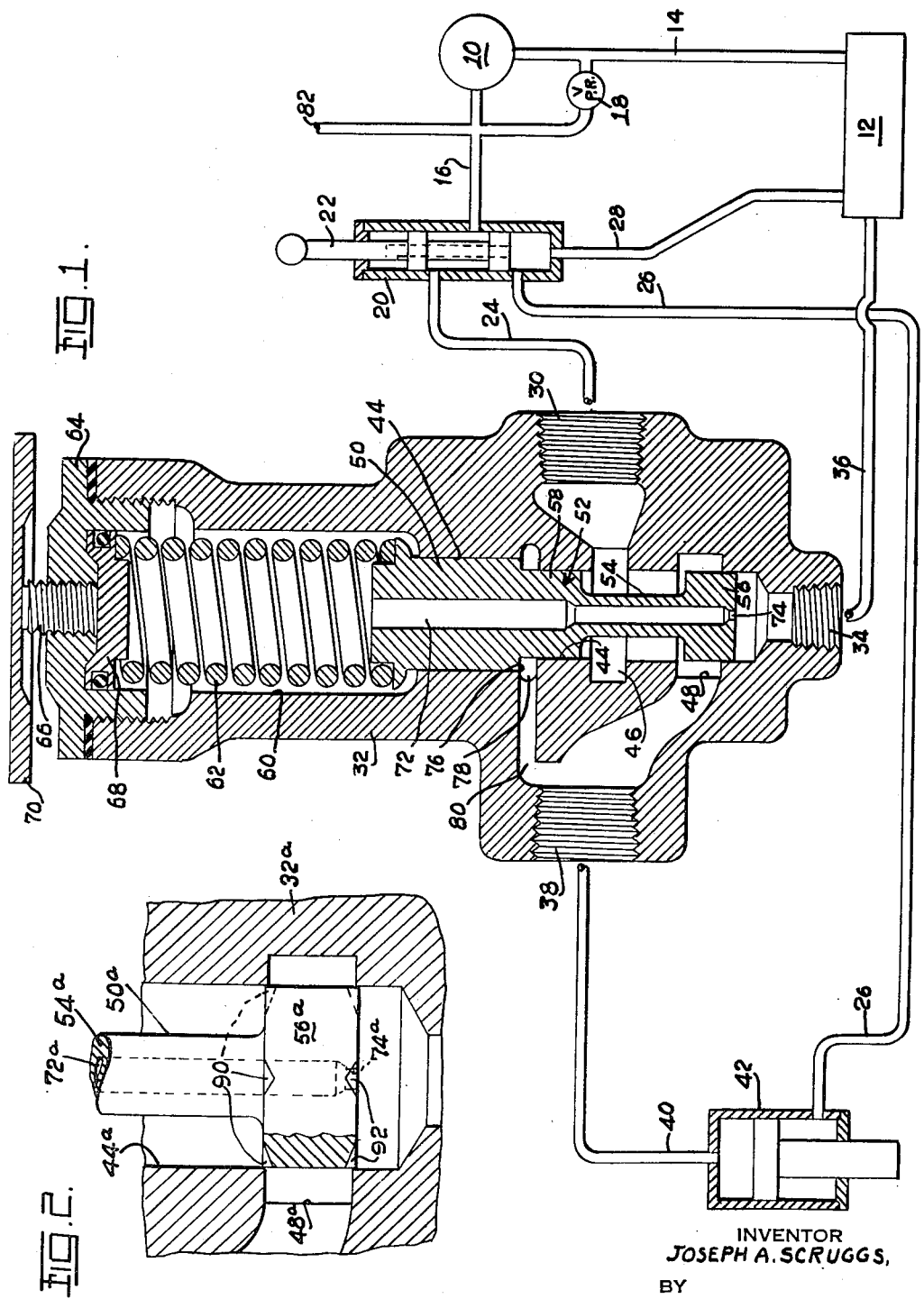
INVENTOR
JOSEPH A. SCRUGGS,
BY
Toulmin & Toulmin
ATTORNEYS Patented Aug. 7, 1951

2,563,192

UNITED STATES PATENT OFFICE 2,563,192

APPARATUS FOR CONTROLLING FLUID PRESSURES

Joseph A. Scruggs, Cincinnati, Ohio, assignor to H-P-M Development Corporation, Wilmington, Del., a corporation of Delaware Application August 26, 1946, Serial No. 693,007

2 Claims. (Cl. 137—153)

This invention relates to hydraulic apparatus and methods in connection therewith, and particularly to methods and apparatus for reducing fluid pressure.

In the usual type of pressure reducing valve there is a continuous bypassing of fluid from the high pressure port to the exhaust port. In valves of this type the valve member has a tendency to come to a position of balance and to halt therein. With the valve member so halted the static friction opposing its movement tends to produce irregularities in the discharge pressure when conditions in the fluid circuit change.

In other types of pressure reducing valves, the valve member responds to variations in inlet pressure which in turn produce variations in the discharge pressure which is undesirable in many instances. The valve of the present invention overcomes these difficulties by being solely responsive to the discharge pressure of the valve, and by being operable to interrupt the fluid communication between the inlet and outlet so that the valve member is substantially continuously in a state of movement and thereby eliminates static friction and produces the very uniform and closely regulated discharge pressure.

One object is to provide an improved pressure reducing valve within which there is a minimum bleed-off of fluid to exhaust.

Still another object is to provide a pressure reducing valve which maintains the reduced pressure within very close limits under all conditions.

It is also an object to provide a pressure reducing valve according to any of the foregoing objects which is readily adjustable as regards the discharge pressure thereof.

It is also an object of this invention to provide means in a hydraulic circuit for maintaining different pressures in the said circuit for the operation of separate motors therein.

These and other objects and advantages will become more apparent upon reference to the following description taken in connection with the attached drawings:

Figure 1 is a diagrammatic view of a valve according to this invention connected in circuit with a motor and a fluid source; and Figure 2 is a fragmentary view showing a modified structure.

Referring to the drawings, Figure 1 shows, diagrammatically, a hydraulic circuit in which is employed a pressure reducing valve according to this invention. There is illustrated a fluid pump at 10 which draws fluid from a reservoir 12 through a conduit 14 and discharges the said fluid at increased pressure into a conduit 16. There may be connected between the conduits 16 and 14 a pressure release valve 18 for the purpose of bypassing the excess delivery of the pump if desired in order to prevent excessive pressure conditions from being generated in the circuit.

The conduit 16 is connected with the inlet of a four-way valve 20 which includes a reciprocable valve member 22. The valve member 22 is movable to connect the conduit 16 with the service conduit 24 while connecting the other conduit 26 with an exhaust conduit 28 or, to connect the conduit 16 with a service conduit 26 while connecting the service conduit 24 with the exhaust conduit 28.

The conduit 24 leads to the inlet 30 of a pressure reducing valve constructed according to the present invention. The valve comprises a casing 32 which includes an exhaust port 34 connected by the conduit 36 with the reservoir 12, and a discharge port 38 which is connected by the conduit 40 with one port of a motor 42. The other port of the motor 42 is connected with the service conduit 26 of the 4-way valve 20.

Returning to the pressure reducing valve, the casing or body 32 thereof is centrally axially bored as at 44 with a passage which connects the ports 30, 34 and 38. The port 30 connects with the said bore by means of the annulus 46 while the port 38 is connected therewith by the annulus 48.

Reciprocably mounted in the said bore is a piston 50 which comprises a reduced diameter lower portion 52 that has an annular groove 54 therearound dividing the said portion into the spaced spool parts 56 and 58. The upper portion of the piston 50 extends through the bore 44 and into a spring recess or chamber 60 within which there is a spring 62 that bears on the upper end of the member 50. The upper end of the spring chamber is closed by a cap 64 which screw threadedly receives a screw 66 which bears against the plate 68 against which the upper end of the spring 62 seats. It will be apparent that the screw 66 is adjustable by the means of the handwheel 70 in order to regulate the tension on the spring 62.

For stabilizing the operation of the valve member 50, the spring chamber 60 may be sealed off so that the upper end of the valve member acts as a dash-pot when the said valve member reciprocates. For draining off the fluid which leaks into the spring chamber, the valve member 50 may be centrally bored as at 72 with a passage which opens through a restricted port 74 into the exhaust port 34. The restriction at 74 serves to enhance the dash-pot action of the piston and spring chamber.

The valve member 50 is urged upwardly by the area 76 thereof which is acted on by pressure fluid conducted into the annulus 78 by the passage 80 leading to the discharge port 38.

In operation, the valve member 50 is normally urged downwardly to establish substantially unrestricted communication between the ports 30 and 38 and to interrupt communication between the ports 34 and 38. In this position fluid may be directed to the motor 42 by shifting the valve member 22 into the position shown in the drawing. Under these conditions the motor 42 will be actuated at full speed until it engages the work to be done.

When the work is engaged and pressure commences to build up in the conduit 40, this pressure is communicated by the passage 80 to the annulus 78. When the said pressure reaches the setting of the spring 62, the valve member 50 will move upwardly and commence to restrict the communication between the bore 44 and the annulus 48. If the motor 42 continues to advance, the annulus 48 will not be completely closed off from the bore 44. However, if the motor is dwelling against the work, then the piston 56 will completely close off communication between the bore 44 and the annulus 48.

Should there be leakage of pressure fluid from the inlet side of the valve into the discharge side thereof, or if for any other reason the pressure in the conduit 40 rises then the valve member 50 will be urged still further upwardly due to the pressure in the annulus 78 acting on the area 76, and communication will be established between the annulus 48 and the exhaust port 34.

It will be noted that the valve acts to control communication between the discharge port and the inlet port, and between the discharge port and the exhaust port, and that at no time is there any fluid connection between the inlet port and the exhaust port. This substantially eliminates any loss of pressure fluid from the circuit so that more economical operation results. Normally, the pressure reducing valve will operate to reduce the fluid communication between the inlet port and the discharge port to a degree which is just sufficient to make up for the leakage of pressure fluid from the motor 42, this normally being a small but appreciable amount.

It will be apparent that the sensitivity of operation of the valve is largely dependent upon the relative axial lengths of the piston portion 56 and the annulus 48. If the piston portion 56 is substantially longer than the said annulus, then the control of the pressure in the discharge port 38 is not so precise but there is correspondingly little loss of fluid to the exhaust port 34. If, on the other hand, the annulus 48 and piston portion 56 are of substantially the same length, then the control of pressure in the discharge port 38 is exceedingly close but there is a continuous if slight, loss of pressure fluid to the exhaust port 34.

It will be apparent that the pressure maintained in the discharge port 38 is substantially independent of the pressure supplied to the valve when the said supply pressure is in excess of the discharge pressure desired. For this reason and also because there is no bypassing of fluid through the reducing valve, the pump can be connected, as by a conduit 82, to other hydraulic auxiliaries which may operate at higher pressures than the motor 42. An example of a hydraulic circuit wherein the valve according to this invention could be employed would be in machine tools or the like having two hydraulic rams which it was desired to operate at different pressures. The ram to be operated at the lower pressure could be supplied from the discharge port of the valve of this invention and the other ram directly from the fluid source 10.

In Figure 2 there is shown a somewhat modified arrangement wherein the parts which are similar to those in Figure 1 are identified by similar numerals with the addition of a subscript a.

In Figure 2 the piston portion 56a is substantially the same axial length as the annulus 48a, and there are the notches or restricted passages 90 in the upper surface of the said piston which affords restricted communication between the inlet port and the annulus 48a when the piston is in the position shown. There may also be the restricted channels or notches 92 in the lower surface of the piston which simultaneously afford restricted communication between the exhaust port and the annulus 48a. By this arrangement the interruption of the communication between the inlet and the outlet ports is gradual while the establishing of communication between the outlet port and the exhaust is also gradual.

In the modification shown, the restricted channels also provide for a continuous bleeding of fluid from the inlet port to exhaust when the piston is in the position shown so that the control of the outlet pressure is very exact and critical.

It will be understood that this invention is susceptible to modification in order to adopt it to different usages and conditions and, accordingly, it is desired to comprehend such modifications within this invention as may fall within the scope of the appended claims.

I claim:

1. In a valve having an inlet port, an outlet port, and an exhaust port; a valve member normally interconnecting said inlet and outlet ports and movable gradually to disconnect said inlet and outlet ports and to connect said outlet port with said exhaust port; yielding means to urge said member into its inlet and outlet port connecting position; fluid operable means connected with said outlet port to urge said valve member toward its inlet port disconnecting position; a closed chamber housing said yielding means and into which said member extends; and restricted channel means connecting said chamber with said exhaust port to damp vibration of the said member.

2. In a valve having an inlet port, an outlet port, and an exhaust port; a valve member normally interconnecting said inlet and outlet ports and movable gradually to disconnect said ports and to connect said outlet port with said exhaust port; yielding means to urge said member into its inlet and outlet port connecting position; fluid operable means connected with said outlet port to urge said valve member toward its inlet and outlet port disconnecting position; a closed chamber housing said yielding means and into which said member extends; and restricted channel means extending through said member for connecting said chamber with said exhaust port to damp vibrations of the said member.

JOS. A. SCRUGGS.

(References on following page)

REFERENCES CITED

The following references are of record in the file of this patent:

UNITED STATES PATENTS

| Number | Name | Date |
|---|---|---|
| 446,799 | Thorpe | Feb. 17, 1891 |
| 609,726 | Ball | Aug. 23, 1898 |
| 776,839 | Hoffman | Dec. 6, 1904 |
| 1,378,026 | Hansen | May 17, 1921 |
| 1,579,940 | Iversen | Apr. 6, 1926 |
| 1,737,428 | Mercur | Nov. 26, 1929 |
| 2,105,876 | Birch | Jan. 18, 1938 |
| 2,219,488 | Parker | Oct. 24, 1940 |
| 2,241,665 | Herman | May 13, 1941 |
| 2,340,196 | Magrum | Jan. 25, 1944 |
| 2,490,175 | Thurman | Dec. 6, 1949 |

FOREIGN PATENTS

| Number | Country | Date |
|---|---|---|
| 87 | Great Britain | of 1863 |
| 411,081 | Great Britain | of 1932 |
| 520,324 | Great Britain | of 1939 |
| 694,225 | Germany | of 1940 |